July 9, 1968   J. R. HUGILL   3,391,426
MOLDING APPARATUS
Filed Oct. 24, 1965

(Actual Size)

INVENTOR.
John R. Hugill
BY
Mueller, Aichele & Rauner
ATTYS.

United States Patent Office 3,391,426
Patented July 9, 1968

3,391,426
MOLDING APPARATUS
John R. Hugill, Phoenix, Arizona, assignor to Motorola, Inc., Franklin Park, Ill., a corporation of Illinois
Filed Oct. 24, 1965, Ser. No. 504,402
4 Claims. (Cl. 18—36)

ABSTRACT OF THE DISCLOSURE

A multiple cavity mold is provided for plastic encapsulation of semiconductor devices having metal leads extending out of the portion of each such device which is encapsulated. Originally, a metallic member for a plurality of such devices is provided which is supported on the mold with the portions to be encapsulated positioned within a mold cavity which is completed when the mold is closed. It is important to maintain the full molding pressure in such cavities during a molding cycle in order that the plastic encapsulation is uniform throughout with no voids which might cause trouble from moisture absorption during the life of the devices. To sustain the molding pressure in a mold cavity a walled receptacle is provided in the mold adjacent a cavity to support an integral or tab portion of the original metallic member extending beyond the main body of that member. A projection in the mold engages and deforms the tab portion coincident with the closing of mold to fill out the walled receptacle and prevent a leakage of the plastic and air which would otherwise reduce the molding pressure in a cavity. After the molding operation is completed the tab portion on the metallic member is removed as the individual devices are separated from one another.

This invention relates to a mold for encapsulating semiconductor devices which is sealed against loss of pressure during the encapsulating operation and semiconductor device parts for accomplishing such sealing.

In seeking a lower cost encapsulating medium, semiconductor manufacturers are using plastic extensively. Potting, where plastic is poured and allowed to cure in an open mold at atmospheric pressure has been widely used in many devices. This type of plastic encapsulation makes it easy to accommodate leads and wire connections in the devices, but generally does not offer as fine a hermetic seal as desired and, due to curing time, requires storage areas for the devices during the curing process.

Transfer molding has also been used as a technique for forming this encapsulation, but certain difficulties have been encountered in using parts for the semiconductor devices which are important for cost savings but add to the molding difficulties. In transfer molding a very tight seal must be formed around the molding cavity to maintain effective pressure therein during the molding cycle. When attempting to encapsulate multiple devices as small as transistors or integrated circuits, the closing of the mold becomes a critical problem. Rubber or a similar soft material is often capable of forming the tight seal required at the closing faces of the mold. However, the high temperature and pressure used in this type of molding limits the life as an effective seal of these flexible materials. Without a tight seal, pressure is lost in the mold cavities and the resulting encapsulations are defective because of voids and poor hermetic seals.

It is an object of this invention to provide a combination which will reduce the cost of a semiconductor device by permitting rapid and positive encapsulation of a plurality of devices in a plastic material.

Another object of this invention is to provide a combination whereby a mold may be rapidly sealed with a portion of a metallic member which is a part of the device assembly so that effective molding pressures may be sustained and a clean product can be removed from the mold.

A feature of this invention is the provision of a mold for plastic material having matching faces that contact a portion of a metallic member which in turn supports a plurality of semiconductor elements to be encapsulated, thereby forming a seal between mold parts and maintaining effective molding pressures in the mold.

Another feature of this invention is the provision of an extension on a portion of a metallic member in the device assembly which will be deformed in such a manner by the closing of a mold that it will fill a receptacle in the mold and seal the mold at the receptacle and maintain effective molding pressures in the mold.

This invention is embodied in a combination of a mold for encapsulating a plurality of semiconductor devices in a plastic material, and a metallic member for supporting a plurality of semiconductor elements to be encapsulated. The metallic member consists of an elongated ladder-like stamped strip which includes a plurality of leads with die and wire supporting portions, grouped according to the number of leads and dice for the ultimate devices.

Figure 1:
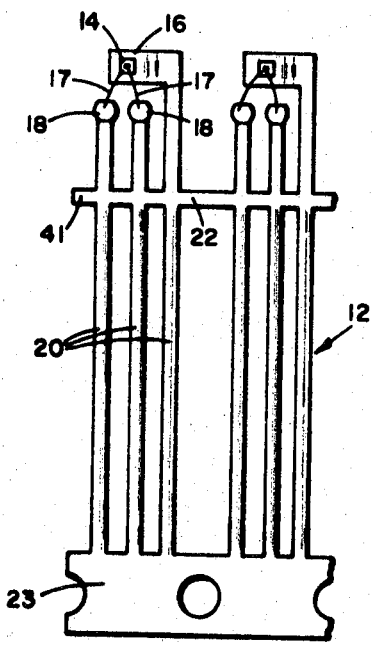
FIG. 1 is an enlarged top view of a portion of a metallic member used in the encapsulation of a semiconductor device according to the invention.

In FIG. 1 a metallic member 12 for use in assembling a transistor is shown after a semiconductor element 14 has been mounted on a die mounting area 16 and connected with fine wires 17 to wire bonding areas 18. Member 12 is made of nickel which has been gold plated and is fabricated to facilitate the use of semiautomatic equipment in assembling a transistor. Member 12 has many groupings, conveniently 50 to 100, of the three external leads 20 for a transistor.

Leads 20 are joined and held in place by a tie strip 22 and a lead mounting portion 23. Lead mounting portion 23 is heavier than tie strip 22 so that it may be used to easily handle the 50 to 100 groups of leads during the various stages of the assembly. Wire bonding areas 18 and die mounting area 16 are maintained in the desired orientation by tie strip 22.

Figure 2:
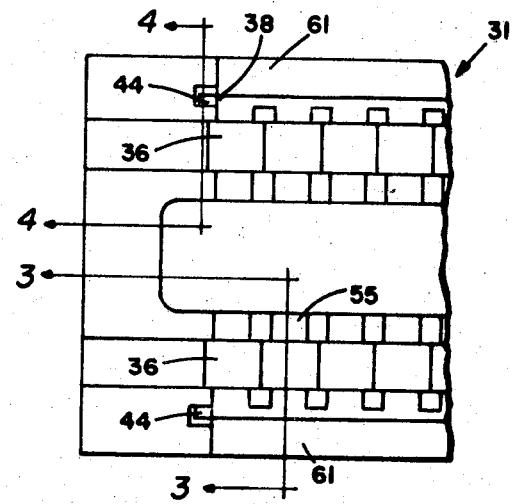
FIG. 2 is a plan view of a portion of a bottom cavity assembly for encapsulating a semiconductor device.

Metallic member 12 with element 14 mounted thereon and fine wires 17 connected to areas 18 is positioned in bottom cavity assembly 31 (FIG. 2) in preparation for encapsulation. Bottom cavity assembly 31 has a plurality of separated cavities 36 in which element 14 and its connections are positioned. The number of cavities 36 in bottom cavity assembly 31 corresponds to the number groupings on metallic member 12. Assembly 31 has openings 61 through which leads 20 may extend. Openings 61 are depressed relative to a surface 38 on which tie strip 22 rests.

Figure 3:
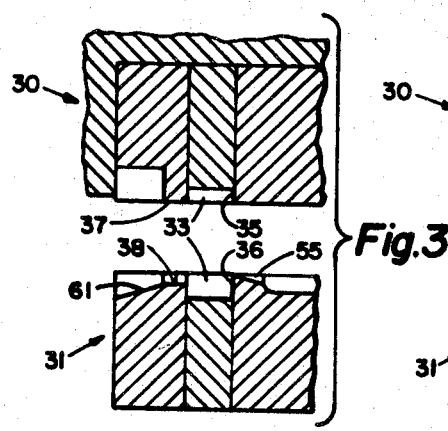
FIG. 3 is a cross-sectional view on the line 3—3 of the assembly of FIG. 2 and a mating top cavity assembly.

Tie strip 22 serves as a portion of the mold used to encapsulate the semiconductor element in plastic. Bottom cavity assembly 31 and top cavity 30, shown in FIG. 3, cooperate with tie strip 22 to partially define a plurality of cavities 33 having an upper portion 35 and a lower portion 36. Cavities 33 are formed by the mating cavity assemblies 30 and 31 and a portion thereof, consisting of an upper matching face 37 and a lower matching face 38, that close on tie strip 22. Since tie strip 22 is made of a material relatively soft compared to the material forming the mold, it deforms when matching faces 37 and 38 are closed. This deformation results in a more intimate contact and seal than can be reasonably obtained with mating machined surfaces. The resulting cavities 33 are defined by metal to metal seals which will effectively withstand the heat and pressure associated with the transfer molding of plastics. Defining cavities in this manner results in a thin flash of plastic between cavities 33 and tie strip 22. This flash has been found desirable because it allows the convenient venting of air from cavities 33 when the plastic is introduced and is easily cleaned off after tie strip 22 has been removed.

Figure 4:
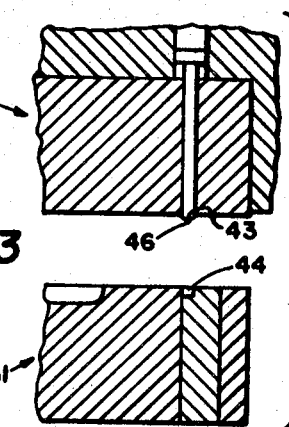
FIG. 4 is a cross-sectional view on the line 4—4 of the assembly of FIG. 2 and a mating top cavity assembly.

FIG. 4 shows another section of the cavity assemblies taken at the end of the molding section of the bottom cavity assembly (FIG. 2) and a mating top cavity assembly. To form a satisfactory plastic encapsulation by transfer molding it is necessary to seal the cavities on all sides. The closing of matching faces 37 and 38 on tie strip 22 effectively defines cavities 33 and seals the mold along the length of metallic member 12. To complete the sealing of cavities 33, an extension of tab 41 of tie strip 22 (FIG. 1) is positioned in receptacle 44. By fabricating extension 41 in line with tie strip 22, a continuous seal is formed around cavities 33 to achieve a seal on all sides of the mold. Tab 41 is provided at each end of metallic member 12.

Figure 5:
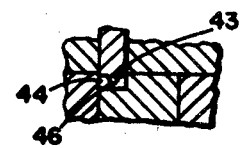
FIG. 5 is an enlarged detailed view of a portion of FIG. 4 illustrating two cooperating members.

Top cavity assembly 30 has a sharp pyramid shaped projection 43 formed so as to have a point 46 extending into receptacle 44 when the mold is closed. The configuration of receptacle 44 and projection 43 are more clearly shown in the enlarged detail view, FIG. 5. Receptacle 44 is fabricated so that tab 41 may be placed therein. Allowance must be made in receptacle 44 for the variations that occur in the width and thickness of tab 41 because of the manner in which it is formed. Because tab 41 is to be urged against the sides of receptacle 44, this receptacle is formed in a movable member of the mold to facilitate the removal of tab 41 after deformation. Projection 43 has a pyramid shape with point 46 extending into receptacle 44.

Figure 6:
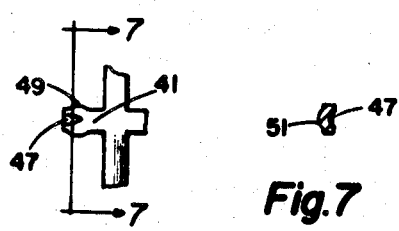
FIG. 6 is an enlarged top view of an end portion of the metallic member shown in FIG. 1 after the mold has been closed.
Figure 7:
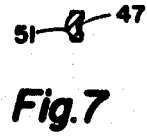
FIG. 7 is a sectional view taken along line 7—7 of the end portion shown in FIG. 6.

With metallic member 12 positioned in the mold between cavity assemblies 30 and 31, projection 43 urges tab 41 into contact with receptacle 44 as the mold closes. When the mold is fully closed, point 46 of projection 43 will deform tab 41 and urge it into intimate contact with the sides of receptacle 44. Point 46 should strike tab 41 in approximately the center to obtain a symmetrical deformation. This symmetrical deformation is more clearly shown in FIG. 6. Depression 47 results from point 46 closing on extension 41. This closing also causes a lateral spreading effect 49 of the edges of extension 41. The cooperation of depression 47 and spreading effect 49 with projection 43 and receptacle 44 forms a seal around the perimeter 51 (FIG. 7) of tab 41. This straight-forward technique of forming cavities 33 of the transfer mold substantially reduces the original cost and the frequency of replacement of mold assemblies 30 and 31 used in forming mold cavities 33.

Figure 8:
FIG. 8 is an actual size perspective view of a transistor device encapsulated using the combination herein described.

The tolerances and quality of the matching and mating surfaces required in this mold are clearly shown by the pressure of 1000 pounds per square inch applied to the molding compound. The combination of this pressure and heat changes the plastic powder to a liquid that flows like water. Gate 55 (FIG. 3) through which this material is supplied to cavities 33 is .005" deep and .145" wide. The vent holes for air (not shown), previously mentioned, which extend across the strip 22 are .0005" deep and .006" wide. These holes must be large enough to permit the escape of air from mold cavities 33, yet small enough to trap the plastic. The minute size of these openings further emphasizes the problems encountered in sealing the mold. The transistor device (FIG. 8) encapsulated in plastic material in a mold sealed according to this invention will be hermetically sealed in a rugged plastic material. Because of the pressures that are utilized and sustained during the molding cycle, this encapsulation is dense and uniform thereby retaining the reliability of the transistor device.

The above description and drawings show that the present invention provides a novel combination for an improved mold for plastic encapsulation of semiconductor elements. Furthermore, by the combination of the invention the cost of a semiconductor device may be reduced by the rapid encapsulation of a plurality of devices in a plastic material. Moreover, the combination rapidly seals a mold with a portion of the metallic member supporting a plurality of semiconductor elements in a manner that sustains effective molding pressures.

I claim:

1. A mold for plastic encapsulation of semiconductor devices under pressure having at least two mold parts with a plurality of molding cavity portions therein which become molding cavities upon closing of said mold parts, a walled receptacle portion in the mold adjacent a molding cavity and connected therewith by a passage, said mold while said mold parts are open being adapted to receive a preformed metallic member having a plurality of semiconductor elements and corresponding metallic portions and a tab portion, with a semiconductor element and corresponding metallic portion positioned in a molding cavity and said tab portion positioned in said walled receptacle portion, said mold parts coincident with the closing of said mold for a plastic encapsulating operation deforming a metallic member tab portion into intimate contact with the wall of said walled receptacle and closing said receptacle, passage means permitting the entry of plastic under pressure into said closed mold and into said plurality of molding cavities, said closed walled receptacle with a deformed tab portion therein sustaining effective molding pressure in said closed mold throughout an encapsulating cycle for a molding operation.

2. In a mold as defined in claim 1, one mold part having a projecting means at the walled receptacle portion of said mold acting to deform a metallic member tab portion in said walled receptacle coincident with the closing of said mold.

3. A mold for plastic encapsulation of semiconductor devices under pressure supporting in the mold a preformed metallic member which includes a plurality of lead portions with semiconductor elements on selected lead portions and also includes a tab portion projecting beyond the final lead portion in said member, said mold having a first cavity part and a second cavity part closeable together to provide multiple cavities in said mold for supporting a lead portion and a corresponding semiconductor element in each of said cavities, said mold also having a walled receptacle therein connecting with cavities and supporting a tab portion, deforming means in said walled receptacle for deforming a tab portion therein coincident with closing of the mold to seal said receptacle with the deformed tab portion, passage means in said mold permitting the entry of plastic under pressure into said closed multiple cavities, with said pressure being maintained throughout an encapsulating cycle for said mold.

4. In a mold as defined in claim 3, said first cavity part and said second cavity part having contacting matching faces on said parts defining said multiple cavities upon closing of said cavity parts, said walled receptacle including a portion in each said cavity part contacting the formed metallic-member-tab-portion, with one cavity part having a projection for said deforming means to deform the tab portion into intimate contact with said walled receptacle and close said receptacle to prevent reduction of molding pressure in said multiple cavities during a molding operation.

References Cited

UNITED STATES PATENTS

| | | |
|---|---|---|
| 2,120,502 | 6/1938 | Morton _____ 18—36 |
| 2,158,044 | 5/1939 | Haller _____ 18—42 X |
| 2,252,054 | 8/1941 | Welch. |
| 2,306,732 | 12/1942 | Huxun. |
| 2,369,291 | 2/1945 | Frank et al. |
| 2,465,656 | 3/1949 | Morin _____ 249—97 X |
| 2,479,350 | 8/1949 | Haggart _____ 18—42 |
| 2,500,546 | 3/1950 | Judisch _____ 249—97 |
| 3,004,298 | 10/1961 | Haynie _____ 18—36 X |
| 3,063,097 | 11/1962 | Jutzi _____ 18—36 |
| 3,175,028 | 3/1965 | Waldes et al. _____ 249—83 X |
| 3,207,832 | 9/1965 | Patti et al. _____ 18—36 X |
| 3,307,221 | 3/1967 | Bolner. |
| 3,315,316 | 4/1967 | Baney et al. _____ 18—36 |

J. HOWARD FLINT, JR., *Primary Examiner.*